United States Patent [19]

Suyama et al.

[11] Patent Number: 4,827,732
[45] Date of Patent: May 9, 1989

[54] FREEZER MACHINE FOR HOUSEHOLD USE

[75] Inventors: Tomio Suyama; Masahide Yatori; Tokiyo Fujita, all of Toyoake, Japan

[73] Assignee: Hoshizaki Denki Kabushiki Kaisha, Aichi, Japan

[21] Appl. No.: 185,161

[22] Filed: Apr. 22, 1988

[30] Foreign Application Priority Data

Apr. 24, 1987 [JP] Japan .................................. 62-102889

[51] Int. Cl.$^4$ ............................................. F25D 21/12
[52] U.S. Cl. ......................................... 62/233; 62/155; 62/158
[58] Field of Search ...................... 62/158, 155, 196.4, 62/233, 234, 352

[56] References Cited

U.S. PATENT DOCUMENTS

| | | | |
|---|---|---|---|
| 2,351,140 | 6/1944 | McCloy | 62/155 X |
| 3,097,503 | 7/1963 | Liebermann | 62/196.4 X |
| 3,316,730 | 5/1967 | Lauer | 62/196.4 X |
| 3,599,440 | 8/1971 | Melion | 62/158 |
| 3,745,781 | 7/1973 | Rasmussen | 62/158 |
| 3,964,270 | 6/1976 | Dwyer | 62/158 X |
| 4,102,389 | 7/1978 | Wills | 62/158 X |
| 4,429,549 | 2/1984 | Randolphi | 62/342 |
| 4,450,692 | 5/1984 | Sharpe et al. | 62/233 |
| 4,563,880 | 1/1986 | Cipelletti | 62/234 |
| 4,583,863 | 4/1986 | Pandolfi | 366/149 |
| 4,655,605 | 4/1987 | Cipelletti | 366/312 |
| 4,664,529 | 5/1987 | Cavalli | 366/149 |
| 4,681,458 | 7/1987 | Cavalli | 366/149 |

Primary Examiner—William E. Tapolcai
Attorney, Agent, or Firm—Parkhurst, Oliff & Berridge

[57] ABSTRACT

A freezer machine includes a freezing vessel arranged to freeze an amount of water for ice or ingredients for ice cream or similar cold products introduced thereinto, a refrigeration circulation circuit including a compressor, a condenser and an evaporator coil arranged for thermal exchange with the freezing vessel, and a solenoid valve disposed within a bypass circuit connected in parallel with the refrigeration circulation circuit to supply therethrough the hot gas outflowing from the compressor directly into the evaporator coil when the solenoid valve has been energized. A power supply circuit for the freezer machine is designed to deactivate the compressor at a predetermined time before the end of ice or ice cream or cold product preparation, and to energize the solenoid valve in response to deactivation of the compressor.

2 Claims, 3 Drawing Sheets

FREEZER MACHINE FOR HOUSEHOLD USE

BACKGROUND OF THE INVENTION

1. Field of the Invention

The present invention relates to a freezer machine for household use, and more particularly to an improvement of a freezer machine for selectively making ice cream or similar products and ice cubes for domestic consumption.

2. Description of the Related Art

In Japanese Patent Publication No. 59-125848 there has been proposed such a freezer machine as described above which comprises a freezing vessel of substantially cylindrical shape mounted within a box-type cabinet to freeze an amount of water or ingredients for ice cream or similar cold products introduced thereinto, and a refrigeration system in the form of a circulation circuit connecting a compressor, a condenser and an evaporator coil in conditions arranged for thermal exchange with the freezing vessel. In the case that an amount of water is directly introduced into the freezing vessel to be frozen into a cylindrical ice formation in the vessel, or a removable ice cream-forming container of substantially cylindrical shape is coupled within the freezing vessel to freeze the ingredients introduced thereinto and retained in place by ice layers formed in a slight interspace between the freezing vessel and container, it is necessary to dissolve the external surfaces of the cylindrical ice formation for removal of it from the freezing vessel or to dissolve the ice layers for removal of the container from the vessel. In such a case, it is advantageous that the hot gas outflowing from the compressor be supplied directly into the evaporator coil to dissolve the external surfaces of the cylindrical ice formation or the ice layers. However, the freezing temperature of the cylindrcal ice formation and the time for dissolution of the ice layers are quite different from those of ice cream or similar cold products. For this reason, it is impossible to automatically effect the dissolution of ice immediately after the formation of ice or ice cream has been finished. Moreover, the ice cream-forming container is usually retained in the freezing vessel for an appropriate period of tine to store therein the prepared ice cream or similar cold products for domestic consumption, and to freeze it when softened.

In view of such various uses of the freezing machine as described above, it is desirable after completion of the freezing operation to stop the compressor to separate the freezing process of water or ingredients from the dissolution process of ice or ice layers. However, the difference in pressure between the high and low pressure parts in the refrigeration circuit will increase if the compressor is restarted a short time after it has been stopped. As a result, the compressor would not be restarted or would be overloaded even if the hot gas overflowing from the compressor was supplied directly into the evaporator coil in response to restarting of the compressor. Such a problem will be experienced in the case that the compressor is restarted a short time after removal of the ice to continually make fresh ice in the freezing vessel, or in the case that the compressor is restarted to further freeze the prepared ice cream or similar cold products a short time after completion of the formation thereof.

SUMMARY OF THE INVENTION

It is, therefore, a primary object of the present invention to provide an improved freezer machine in which the compressor can be smoothly restarted without any overload acting thereon.

According to the present invention there is provided a freezer machine which comprises a freezing vessel arranged to freeze an amount of water for ice or ingredients for ice cream or similar cold products introduced thereinto, a refrigeration system in the form of a circulation circuit including a compressor, a condenser and an evaporator coil arranged for thermal exchange with the freezing vessel, a solenoid valve of the normally closed type disposed within a bypass circuit connected in parallel with the refrigeration circulation circuit to supply therethrough the hot gas outflowing from the compressor directly into the evaporator coil when the solenoid valve has been energized, and a power supply circuit comprising means for setting a first predetermined period of time for preparation of ice or ice cream or similar cold products, means for deactivating the compressor at a predetermined time before lapse of the first predetermined period of time, and means for energizing the solenoid valve in response to deactivation of the compressor.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
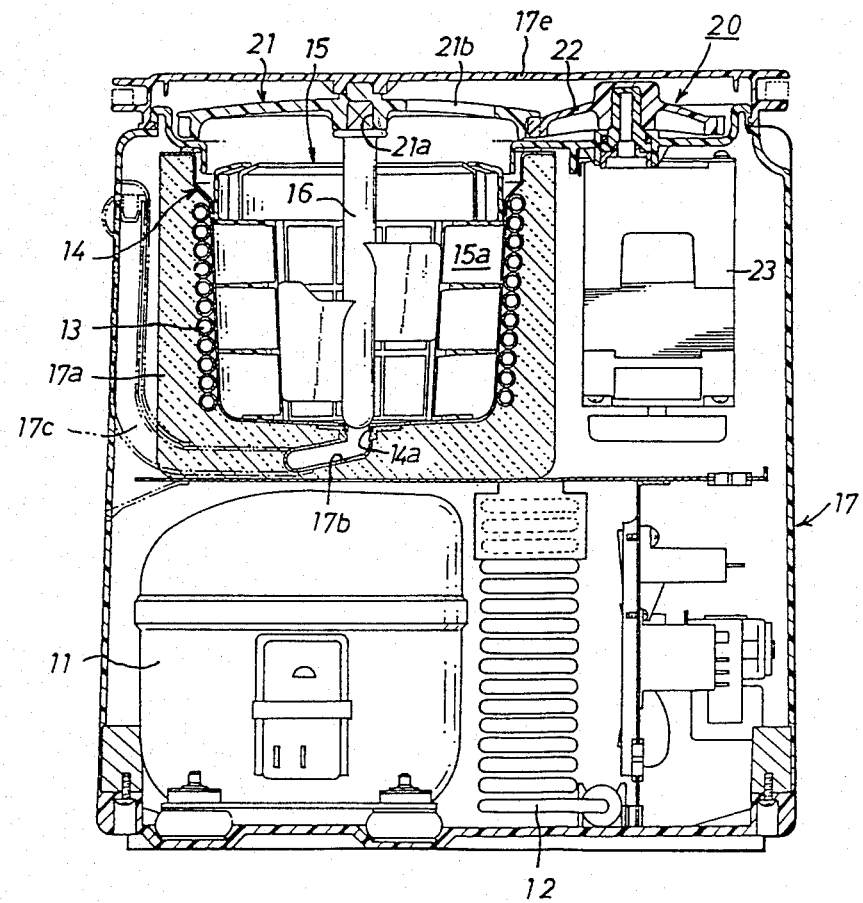
FIG. 1 is a vertical cross-sectional view of a freezer machine in accordance with the present invention.

With reference to FIG. 1, the freezer machine comprises a freezing vessel 14 of substantially cylindrical shape mounted within a box-type cabinet 17, a refrigeration system including a compressor 11, a condenser 12 and an evaporator coil 13 which are housed in the cabinet 17, a removable annular multicell frame assembly 15, a removable stirring element 16 associated with the frame assembly 15, and a drive mechanism 20 for the stirring element 16. In addition, the freezer machine further comprises an ice cream-forming container (not shown) and another removable stirring element (not shown) associated with the container.

The freezing vessel 14 is surrounded by the evaporator coil 13 for thermal exchange therewith, the coil 13 being embedded in a heat-insulative layer 17a. The freezing vessel 14 opens at the top and has a bottom formed at its center with an aperture 14a to which a drain plug 17b is fixedly attached in a fluid-tight manner. A flexible drain hose 17c of elastic material is connected at its one end to the drain plug 17b and extends outwardly from the cabinet 17 through a portion of heat-insulative layer 17a. The outer end portion of flexible hose 17c is removably supported in place by engagement with a holder (not shown) secured to the external side wall of cabinet 17 at a position above the aperture 14a of vessel 14. The removable annular multicell frame assembly 15 is composed of three semi-cylindrical frame elements which are equally divided in a circumferential direction. The semi-cylindrical frame elements are each constructed to form a multiplicity of freezing cells 15a therein. The freezing cells 15a are tapered to open radially outwardly so as to facilitate the release of ice cubes frozen therein.

The stirring element 16 comprises a rotary shaft of synthetic resin integral with two angularly spaced blades. The rotary shaft of element 16 has a lower end rotatably supported in place by engagement with the bottom aperture 14a of freezing vessel 14, and has an upper end of rectangular cross-section which is coupled with the corresponding recess 21a in a large diameter driven gear 21 of the drive mechanism 20. The drive mechanism 20 includes a small diameter drive gear 22 in mesh with the driven gear 21, and an electric motor 23 arranged to rotate the drive gear 22. The electric motor 23 is housed in the cabinet 17 at one side of the heat-insulative layer 17a for freezing vessel 14 and is mounted on an upper plate of cabinet 17. Thus, the stirring element 16 is rotated by the power applied thereto from the electric motor 23 through the drive and driven gears 22 and 21. A transparent lid 17e of hard synthetic resin is removably coupled over an outer peripheral rim of the upper plate of cabinet 17. The lid 17e is formed at its internal wall with a cylindrical recess which is rotatably coupled with a central projection of driven gear 21 when the lid 17e has been coupled over the upper plate of cabinet 17. The coupling of lid 17e with the driven gear 21 is useful to position the driven gear 21 and stirring element 16 in place during operation of the electric motor 23.

Figure 2:
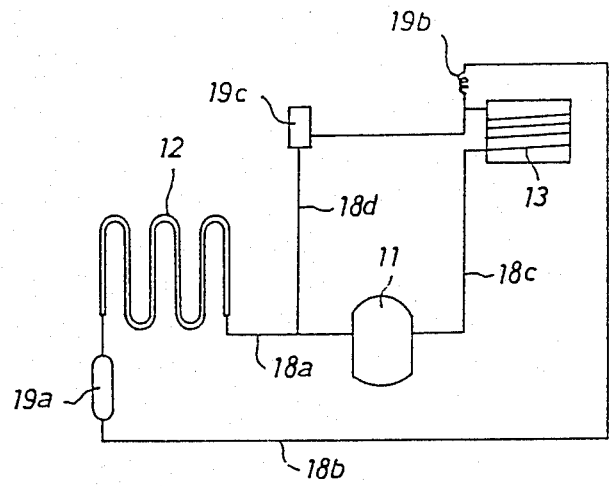
FIG. 2 is an illustration of a refrigeration system adapted to the freezer machine.

As shown in FIG. 2, the refrigeration system is in the form of a circulation circuit which includes the compressor 11, condenser 12 and evaporator coil 13. The circulation circuit further includes a dryer 19a and a capillary tube 19b disposed within a conduit 18b between the condenser 12 and evaporator coil 13, a bypass conduit 18d connected at its one end to a conduit 18a between the compressor 11 and condenser 12 and at its other end to a conduit between the capillary tube 19b and evaporator coil 13, and a solenoid valve 19c of the normally closed type disposed within the bypass conduit 18d. A return conduit 18c is connected at its one end to the evaporator coil 13 and at its other end to the compressor 11. When the compressor 11 is activated under a deenergized condition of solenoid valve 19c, a refrigerating fluid circulates through the conduits 18a, 18b and 18c, in sequence. When the solenoid valve 19c is energized during activation of the compressor 11, the refrigerating fluid circulates through the conduits 18a, 18d and 18c, in sequence.

Figure 3:
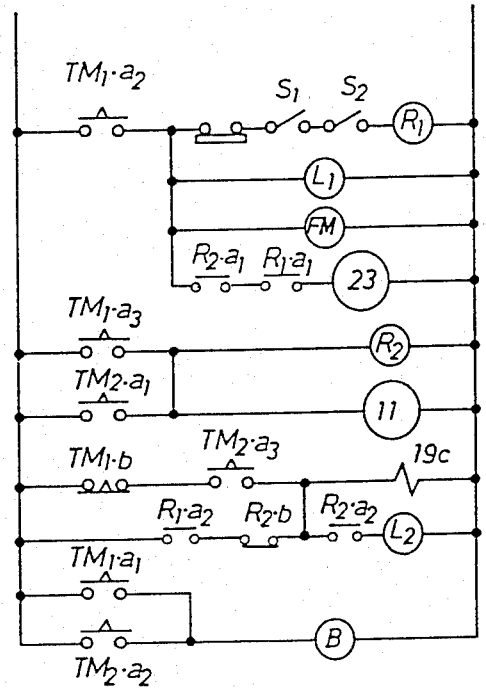
FIG. 3 is an illustration of a power supply circuit for the freezer machine.

In this embodiment, the freezer machine comprises a power supply circuit designed to deactivate the compressor 11 at a predetermined time before the end of ice or ice cream preparation and to energize the solenoid valve 19c in response to deactivation of the compressor 11. As illustrated in FIG. 3, the power supply circuit includes a first timer $TM_1$ for ice making and a second timer $TM_2$ for dissolution of frozen ice. The first timer $TM_1$ for ice making is provided with three normally open contacts $TM_1.a_1$, $TM_1.a_2$, $TM_1.a_3$ and a normally closed contact $TM_1.b$ each reset time of which can be adjusted by manipulation of the timer $TM_1$. When the first timer $TM_1$ is set to operate for a first predetermined period of time, for instance sixty minutes, the normally open contacts $TM_1.a_1$–$TM_1.a_3$ are closed while the normally closed contact $TM_1.b$ is opened. In this embodiment, the first timer $TM_1$ is designed to reset only the contact $TM_1.a_3$ at several minutes, for instance three minutes, before the lapse of the first predetermined period of time and to reset the remaining contacts after the lapse of the first predetermined period of time.

The second timer $TM_2$ for dissolution of frozen ice is provided with three normally open contacts $TM_2.a_1$, $TM_2.a_2$, $TM_2.a_3$ each reset time of which can be adjusted by manipulation of the timer $TM_2$. When the second timer $TM_2$ is set to operate for a second predetermined period of time, for instance five minutes, the normally open contacts $TM_2.a_1$–$TM_2.a_3$ are closed and reset after the lapse of the second predetermined period of time. The power supply circuit further includes normally open switches $S_1$, $S_2$ arranged to be closed by engagement with the lid 17e when it has been coupled with the upper plate of cabinet 17, a relay $R_1$ associated with normally open contacts $R_1.a_1$, $R_1.a_2$, and a relay $R_2$ associated with normally open contacts $R_2.a_1$, $R_2.a_2$, and a normally closed contact $R_2.b$.

In use of the freezer machine, ice cream or ice cubes can be selectively prepared by replacement of the multicell frame assembly 15 and its associated stirring element 16 with the ice cream-forming container (not shown) and its associated stirring element. When it is desired to make ice cubes, a desired amount of water is introduced into the freezing vessel 14 in a condition where the outer end portion of drain hose 17c has been supported in place by engagement with the holder at the outside wall of cabinet 17. Thereafter, the multicell frame assembly 15 is coupled within the freezing vessel 14 and the stirring element 16 is settled in the freezing vessel 14 as shown in FIG. 1. In this instance, the rotary shaft of stirring element 16 is positioned in place by engagement with the bottom aperture 14a of vessel 14 at its lower end and engagement with the recess of driven gear 21 at its upper end. After settlement of the stirring element 16, the lid 17e is coupled over the upper plate of cabinet 17 to postion the driven gear 21 and stirring element 16 in place and to close the normally open switches $S_1$ and $S_2$.

Figure 4:
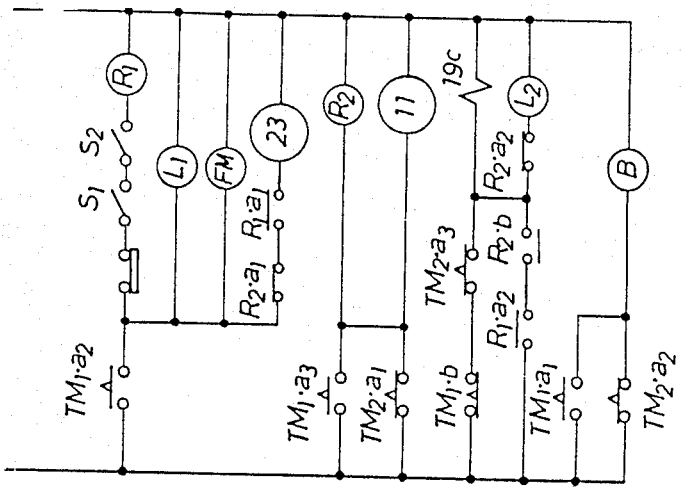
FIGS. 4 (A) to (C) illustrate a mode of operation of the power supply circuit.
Figure 4:
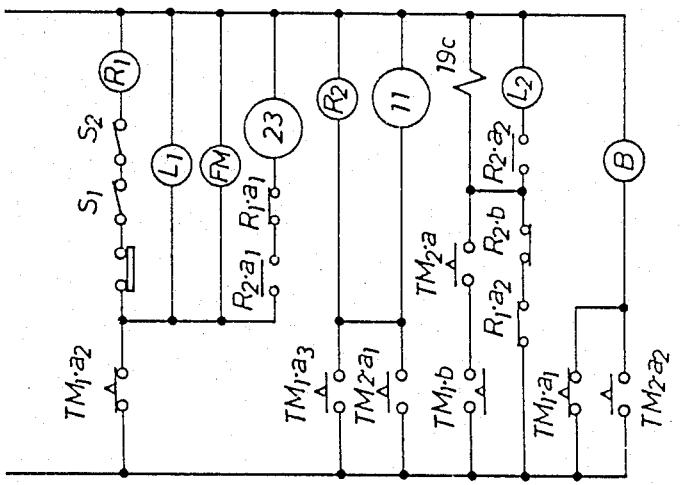
Figure 4:
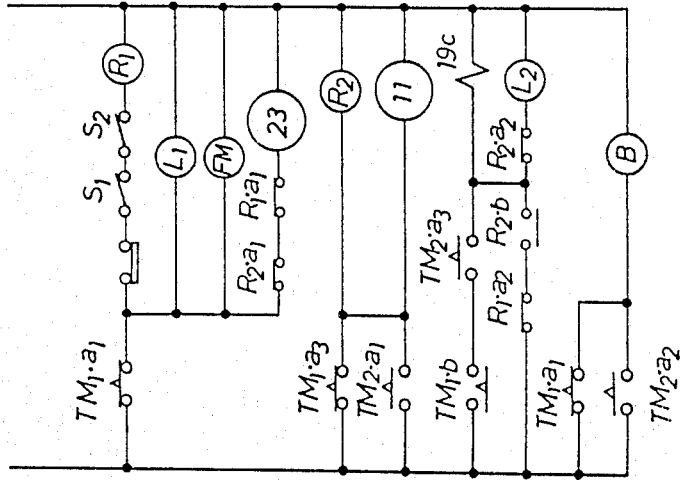

After the freezer machine has been set in the manner described above, the first timer $TM_1$ for ice making is set to operate for sixty minutes. Thus, as shown in FIG. 4(A), the normally open contacts $TM_1a._1$–$TM_1.a_3$ are closed while the normally closed contact $TM_1.b$ is opened. Simultaneously, the relays $R_1$, $R_2$ are energized to close the normally open contacts $R_1.a_1$, $R_1.a_2$, $R_2.a_1$, $R_2a_2$ and to open the normally closed contact $R_2.b$. As a result, the compressor 11, electric motor 23 and fan motor FM are activated by the electric power applied thereto. During activation of the compressor 11, a lamp $L_1$ indicative of ice making is lighted, and a buzzer B is energized to be activated after the lapse of sixty minutes.

In such a condtion as described above, the solenoid valve 19c is maintained in a deenergized condition to cut out the bypass circuit 18d from the refrigeration circuit. Thus, the refrigerating fluid circulates through the conduits 18a, 18b and 18c to cool the freezing vessel 14 by thermal exchange with the evaporator coil 13, and the stirring element 16 rotates at a low speed in the freezing vessel 14 to stir the water to be frozen. When the temperature of freezing vessel 14 decreases sufficiently below the freezing point of water, transparent ice gradually forms outside each of the freezing cells 15a of frame assembly 15 and builds up radially inwardly along the partition walls of frame assembly 15 to gradually fill the interior of freezing cells 15a. At three minutes before the lapse of sixty minutes, the first timer $TM_1$ acts to reset only the normally open contact $TM_1.a_3$. Thus, the relay $R_2$ is deenergized to open the normally open contacts $R_2.a_1$, $R_2.a_2$ so as to deactivate the compressor 11 and motor 23. Simultaneously, the normally closed contact $R_2.b$ is closed to energize the solenoid valve 19c. (see FIG. 4(B)) After the lapse of three minutes, the first timer $TM_1$ acts to reset the other normally open contacts $TM_1.a_1$, $TM_1.a2$ and normally closed contact $TM_1.b$ and to deenergize the relay $R_1$ so as to open the contacts $R_1.a_1$, $R_1.a_2$. As a result, the lamp $L_1$, fan motor FM and solenoid valve 19c are deenergized, and the buzzer B is activated for five seconds to inform of the end of the ice formation.

When the second timer $TM_2$ for dissolution of frozen ice is set immediately after the end of ice formation to operate for five minutes, the normally open contacts $TM_2.a_1$–$TM_2.a_3$ are closed to energize the relay $R_2$. Upon energization of the relay $R_2$, the contacts $R_2.a_1$, $R_2.a_2$ are closed while the contact $R_2.b$ is opened as shown in FIG. 4(C). Thus, a lamp $L_2$ indicative of dissolution of frozen ice is lighted, the compressor 11 is restarted, the buzzer B is energized to be activated after the lapse of five minutes, and the solenoid valve 19c is energized to open the bypass conduit 18d thereby to permit circulation of the refrigerating fluid through the conduits 18a, 18d and 18c. As a result, the hot gas outflowing from the compressor 11 is supplied directly into the evaporator coil 13 to dissolve the film of frozen ice formed on the internal surfaces of freezing vessel 14. After the lapse of five minutes, the second timer $TM_2$ acts to reset the normally open contacts $TM_2.a_1$–$TM_2.a_3$. Thus, the relay $R_2$ is deenergized to open the contacts $R_2.a_1$, $R_2.a_2$ and to close the contact $R_2.b$. As a result, the lamp $L_2$ is deenergized, the compressor 11 is deactivated, the solenoid valve 19c is deenergized, and the buzzer B is activated for five seconds to inform of the end of dissolution of frozen ice. When the lid 17e is removed from the cabinet 17, the switches $S_1$, $S_2$ are opened to deactivate the power supply circuit.

Having now fully set forth a preferred embodiment of the concept underlying the present invention, various modifications and variations of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A freezer machine comprising:
   a freezing vessel arranged to freeze an amount of water for ice or ingredients for ice cream or similar cold products introduced thereinto;
   a refrigeration system in the form of a circulation circuit including a compressor, a condenser and an evaporator coil arranged for thermal exchange with said freezing vessel;
   a solenoid vessel valve of the normally closed type disclosed within a bypass circuit connected in parallel with the refrigeration circulation circuit to supply therethrough the hot gas outflowing from said compressor directly into said evaporator coil when said solenoid valve has been energized; and
   a power supply circuit comprising means for setting a first predetermined period of time for preparation of ice or ice cream or similar cold products, means for deactivating said compressor at a predetermined time before lapse of the first predetermined period of time, and means for energizing said solenoid valve in response to deactivation of said compressor.

2. A freezer machine as claimed in claim 1, wherein said power supply circuit further comprises means for activating said compressor for a second predetermined period of time for dissolution of a film of frozen ice formed on internal surfaces of said freezing vessel after the end of ice or ice cream or cold product preparation, and means for energizing said solenoid valve for the second predetermined period of time in response to activation of said compressor.

* * * * *